(12) United States Patent
Ramos

(10) Patent No.: US 12,734,975 B2
(45) Date of Patent: Sep. 15, 2026

(54) MULTI-USE STORAGE UNIT OR MODULE THAT IS ATTACHABLE TO THE REAR DOOR OF A VEHICLE

(71) Applicant: Jose Angel Rivera Ramos, Aguadilla, PR (US)

(72) Inventor: Jose Angel Rivera Ramos, Aguadilla, PR (US)

( * ) Notice: Subject to any disclaimer, the term of this patent is extended or adjusted under 35 U.S.C. 154(b) by 196 days.

(21) Appl. No.: 18/783,720

(22) Filed: Jul. 25, 2024

(65) Prior Publication Data

US 2025/0042341 A1 Feb. 6, 2025

Related U.S. Application Data

(60) Provisional application No. 63/530,419, filed on Aug. 2, 2023.

(51) Int. Cl.

| | |
|---|---|
| ***B60R 9/06*** | (2006.01) |
| ***B65D 25/04*** | (2006.01) |
| ***B65D 25/22*** | (2006.01) |
| ***B65D 43/16*** | (2006.01) |
| ***B65D 43/22*** | (2006.01) |

(52) U.S. Cl.

CPC .............. *B60R 9/065* (2013.01); *B65D 25/04* (2013.01); *B65D 25/22* (2013.01); *B65D 43/163* (2013.01); *B65D 43/22* (2013.01); *B65D 2543/00194* (2013.01)

(58) Field of Classification Search

CPC ........ B60R 9/065; B65D 25/04; B65D 25/22; B65D 43/163; B65D 43/22; B65D 2543/00194; B25H 3/02; B25H 3/021; B25H 3/022

USPC ......... 224/527; 220/476, 481, 483; 206/372, 206/373

See application file for complete search history.

(56) References Cited

U.S. PATENT DOCUMENTS

| | | | | |
|---|---|---|---|---|
| 5,314,101 | A * | 5/1994 | White | B60R 9/065 224/527 |
| 5,413,260 | A * | 5/1995 | McFarland | B60R 9/065 224/543 |
| 5,620,123 | A * | 4/1997 | Brisbois | B60R 9/065 224/511 |
| 5,700,293 | A * | 12/1997 | Rydell | D06F 95/002 232/1 R |
| 5,924,615 | A * | 7/1999 | McGarrah | B60R 9/00 224/404 |
| 6,062,416 | A * | 5/2000 | Smillie | A47B 46/005 220/524 |
| 6,736,265 | B2 * | 5/2004 | Kipper | B25H 3/028 206/811 |
| D557,542 | S * | 12/2007 | Brandon | D6/559 |
| 8,231,036 | B2 * | 7/2012 | Campbell | B60R 9/065 224/42.32 |
| 9,914,209 | B2 * | 3/2018 | Grela | A47B 81/00 |
| 12,559,018 | B2 * | 2/2026 | Parker | B60N 3/16 |
| 2022/0111797 | A1 * | 4/2022 | Plaksin | B60R 9/065 |
| 2024/0278729 | A1 * | 8/2024 | Rowley | B60R 11/06 |

* cited by examiner

*Primary Examiner* — Corey N Skurdal

(74) *Attorney, Agent, or Firm* — Eugenio J. Torres-Oyola; Victor M. Rodriguez-Reyes; Rafael Rodriguez-Muriel

(57) ABSTRACT

A multi-use storage unit or module that is attachable to the rear door of a vehicle that comprises a plurality of compartments, and at least one of a water cooler chest, a water deposit tank, a small stove/grill, a storage drawer, a tray; and lighting assemblies, or combinations thereof.

19 Claims, 17 Drawing Sheets

MULTI-USE STORAGE UNIT OR MODULE THAT IS ATTACHABLE TO THE REAR DOOR OF A VEHICLE

FIELD OF THE DISCLOSURE

The present disclosure relates generally to a multi-use storage unit or module that is attachable to the rear door of a sports utility vehicle.

BACKGROUND OF THE DISCLOSURE

There are several tailgate or rear door storage containers available in the marketplace. Most of these containers are secured to the hitch receiver of a vehicle. These storage containers typically include an interior space suitable for organizing and storing various pieces of equipment or equipment for outdoor activities therein. The aforementioned containers, however, tend to be bulky and as such, increase the surface area of a vehicle significantly; thereby causing further problems for the driver of the vehicle, such as finding parking space that is big enough to accommodate the container attached to the vehicle; or by requiring the driver to exercise greater caution when making right or left turns with the vehicle while driving or when changing driving lanes. Another issue with current storage containers on vehicles is that they do not have the look and feel of the vehicle in question. As such, they look like an item attached to the vehicle rather than an item designed to be part of the vehicle in question. Lastly, since these container are meant to be attached or secured to the hitch receiver of the vehicle, they do not preserve the aerodynamic properties of the vehicle.

Therefore, there is a need for a rear door storage unit that is compact yet able to provide enough storage space for tools or equipment; and that is able to look aesthetically pleasing, while also preserving the aerodynamic properties of the vehicle, so that it can provide a uniform look to the vehicle.

SUMMARY OF THE DISCLOSURE

A multi-use storage module that is attachable to a vehicle's rear door, comprising a first sidewall, a second sidewall, a rear panel, a front panel, and a base, wherein each of the first sidewall, the second sidewall, the rear panel, and the front panel is perpendicularly connected to the base; wherein the first sidewall and the second sidewall connect the front panel and the rear panel to each other, thereby forming a perimeter that defines an interior volume for the storage module; a horizontal internal partition within the storage module that is adapted to divide the interior volume of the storage module into an upper compartment with an interior space and a lower compartment with an interior space; a top lid pivotally secured to an upper portion of the rear panel, wherein the top lid is adapted to provide access into the upper compartment or to close off access thereto; a bottom lid pivotally secured to the front panel, wherein the bottom lid is adapted to provide access into the lower compartment or to close off access thereto; and wherein the interior space of the lower compartment comprises a vertical partition adapted to subdivide the lower compartment into a first sub-compartment and a second sub-compartment. The multi-use storage module is adapted to house at least one of an ice chest, a water deposit tank, a stove, a grill unit, a storage drawer, a tray, and one or more lighting assemblies, or combinations thereof.

DETAILED DESCRIPTION OF THE DISCLOSURE

Figure 12:
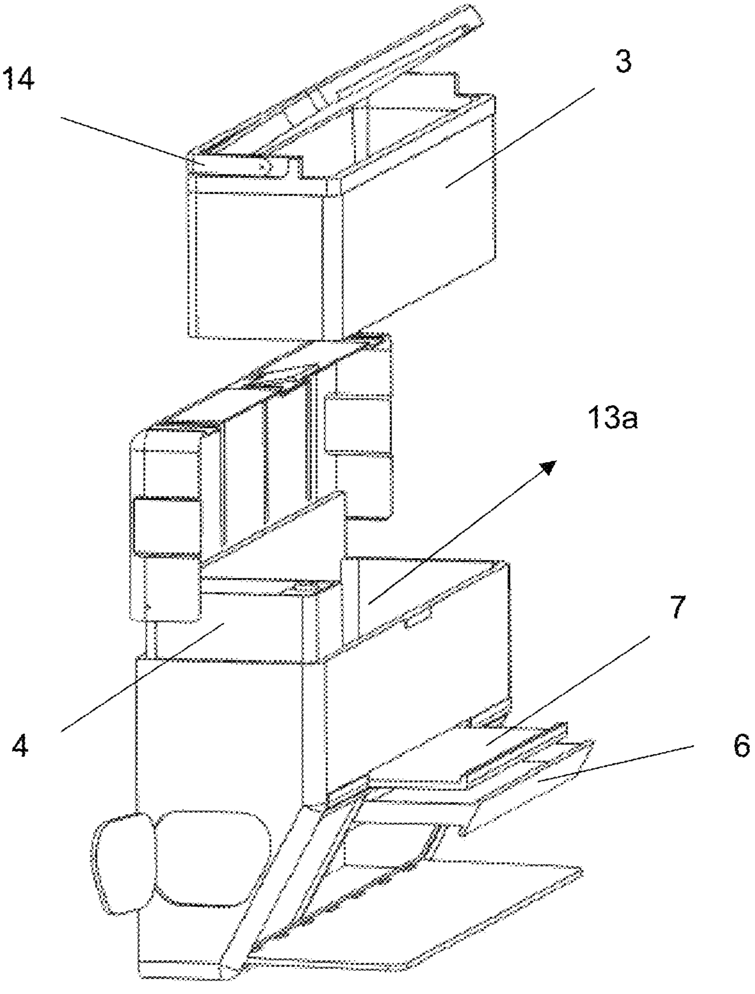
FIG. 12 shows an exploded view of the components of the multi-use storage unit or module, in accordance with the principles of the present disclosure.
Figure 13:
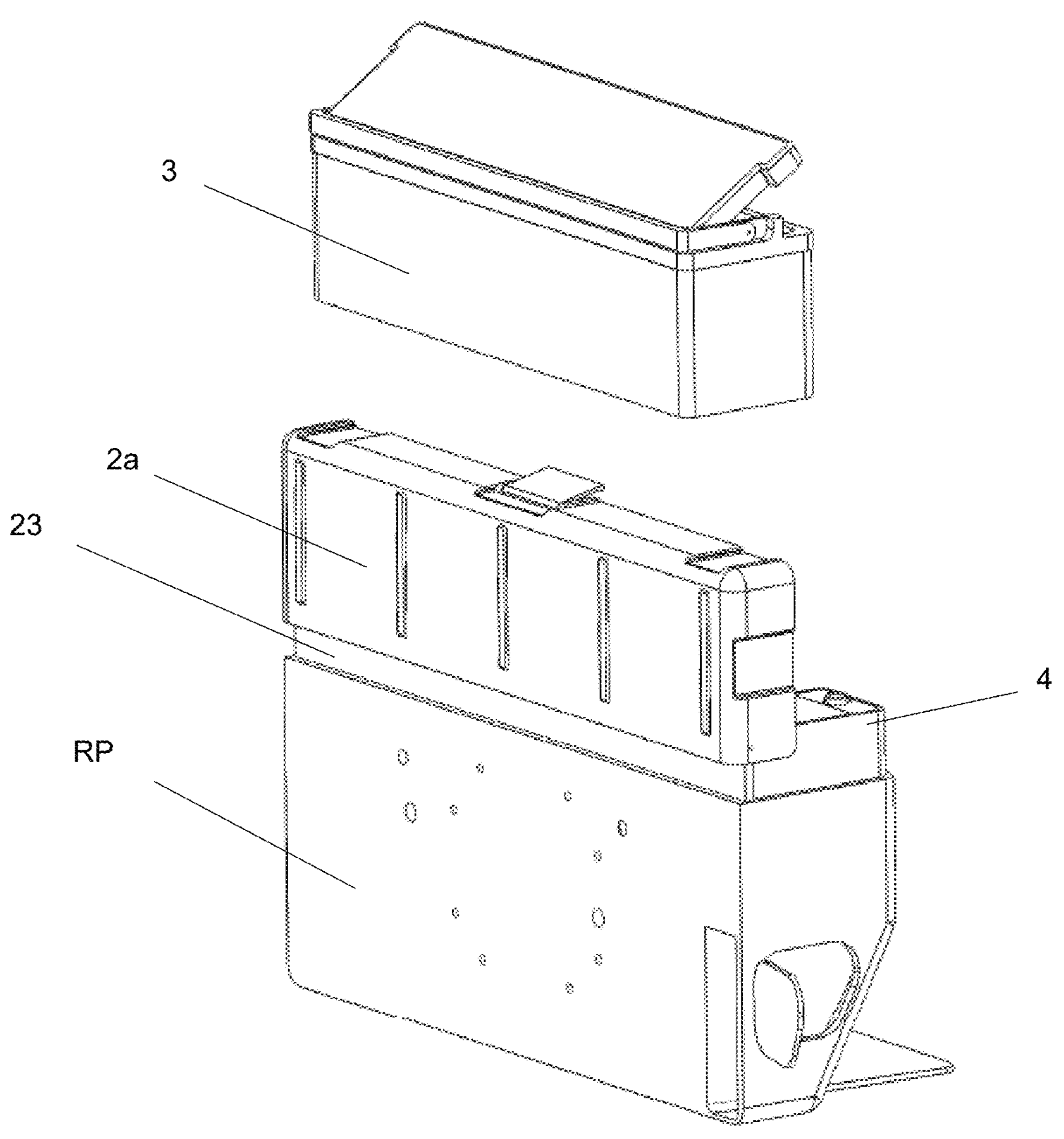
FIG. 13 shows an exploded rear view of the components multi-use storage unit or module, in accordance with the principles of the present disclosure.

As shown in FIGS. 1-17, the subject disclosure relates to a multi-use storage unit or module 1 that is attachable to the rear door of a vehicle (such as a sports utility vehicle) that comprises a top lid 2*a*, an ice chest or cooler 3, a water deposit tank 4, a stove 5*a*, a grill unit 5*b*, a storage drawer 6, a tray 7; and one or more lighting assemblies 8*a*, 8*b* that assist in alerting other drivers behind the vehicle of the vehicle's presence. The multi-use storage module 1 further comprises a first sidewall SW1, a second sidewall SW2, a rear panel RP, a front panel FP, and a base B1, wherein each of the first sidewall SW1, the second sidewall SW2, the rear panel RP, and the front panel FP is perpendicularly connected to the base B1; and wherein the first sidewall SW1 and the second sidewall SW2 connect the front panel FP and the rear panel RP to each other, thereby forming a perimeter 12 that defines an interior volume or space for the storage module 1. In a preferred embodiment each of the rear panel RP and the front panel FP have a length that is greater than the length of each of the first sidewall SW1 and the second sidewall SW2. As such, in this preferred embodiment, the multi-use storage unit or module 1 has a rectangular configuration. It should be noted that the rear panel RP includes one or more holes H1-H12 adapted to receive bolts or fasteners to secure the multi-use storage unit or module 1 to the rear door of the vehicle in question, as shown in FIG. 2. Nonetheless, the multi-use storage unit or module 1 may also be attached to the rear door of the vehicle in question via alternative means, such as by securing hooks to the rear door of the vehicle and attaching the storage module 1 thereto; or by simply drilling the rear panel RP of the storage module 1 directly to the rear door of the vehicle. It should be noted that the one or more holes H1-H12 on the rear panel RP are also adapted to receive the aforementioned hooks to secure the storage module 1 to the rear door of the vehicle. The rear panel RP may also include an extended portion 23, preferably attached to the inner surface of the rear panel (i.e., the surface within the interior volume of the storage module), that is adapted to provide an anchoring area for the hinge of the top lid 2*a*; and may also include an opening 24 that is adapted to provide access to the vehicle's rear door handle, as shown in FIGS. 2 and 13.

Figure 3:
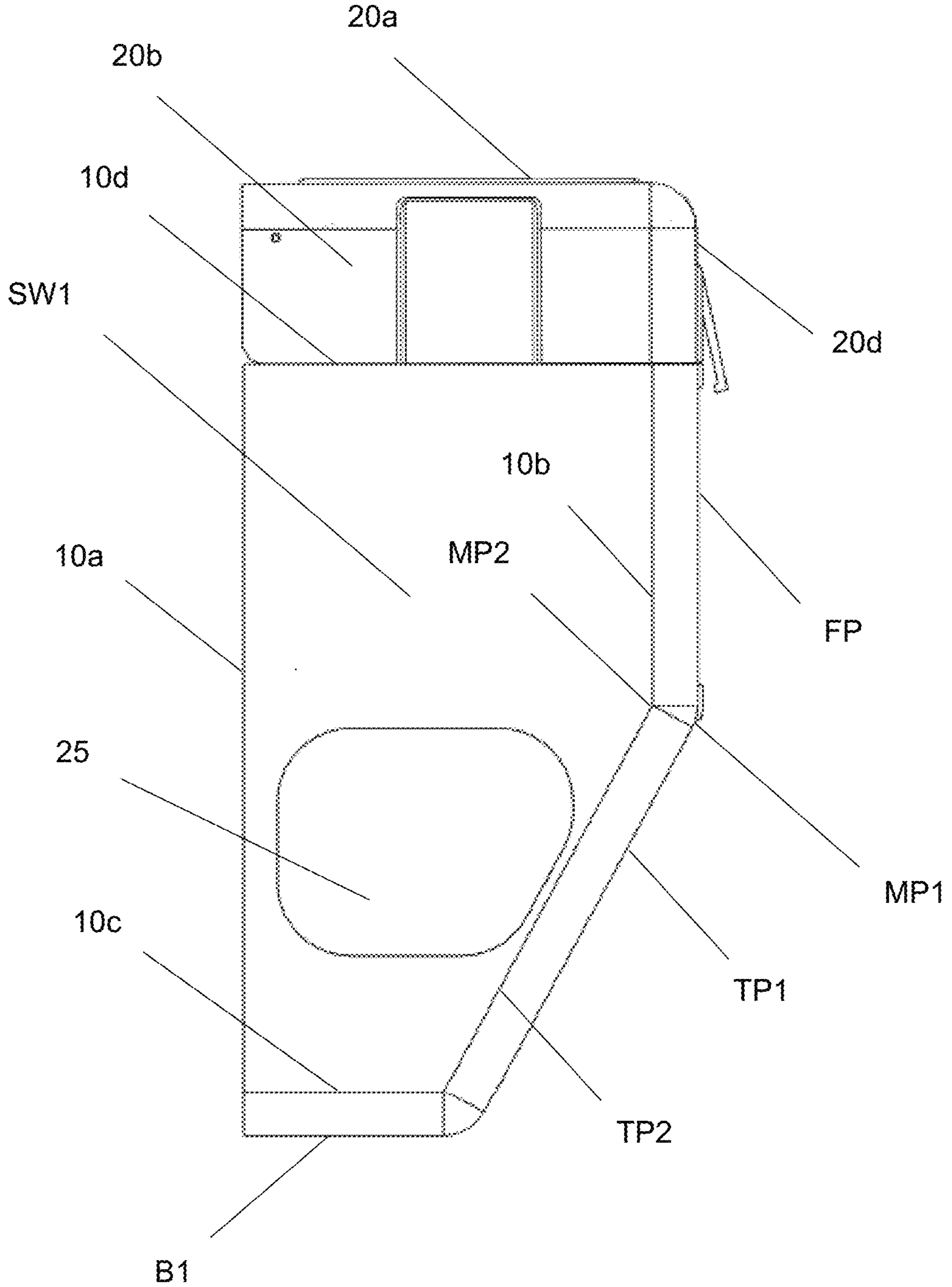
FIG. 3 shows a left-side view of the multi-use storage unit or module, in accordance with the principles of the present disclosure.
Figure 4:
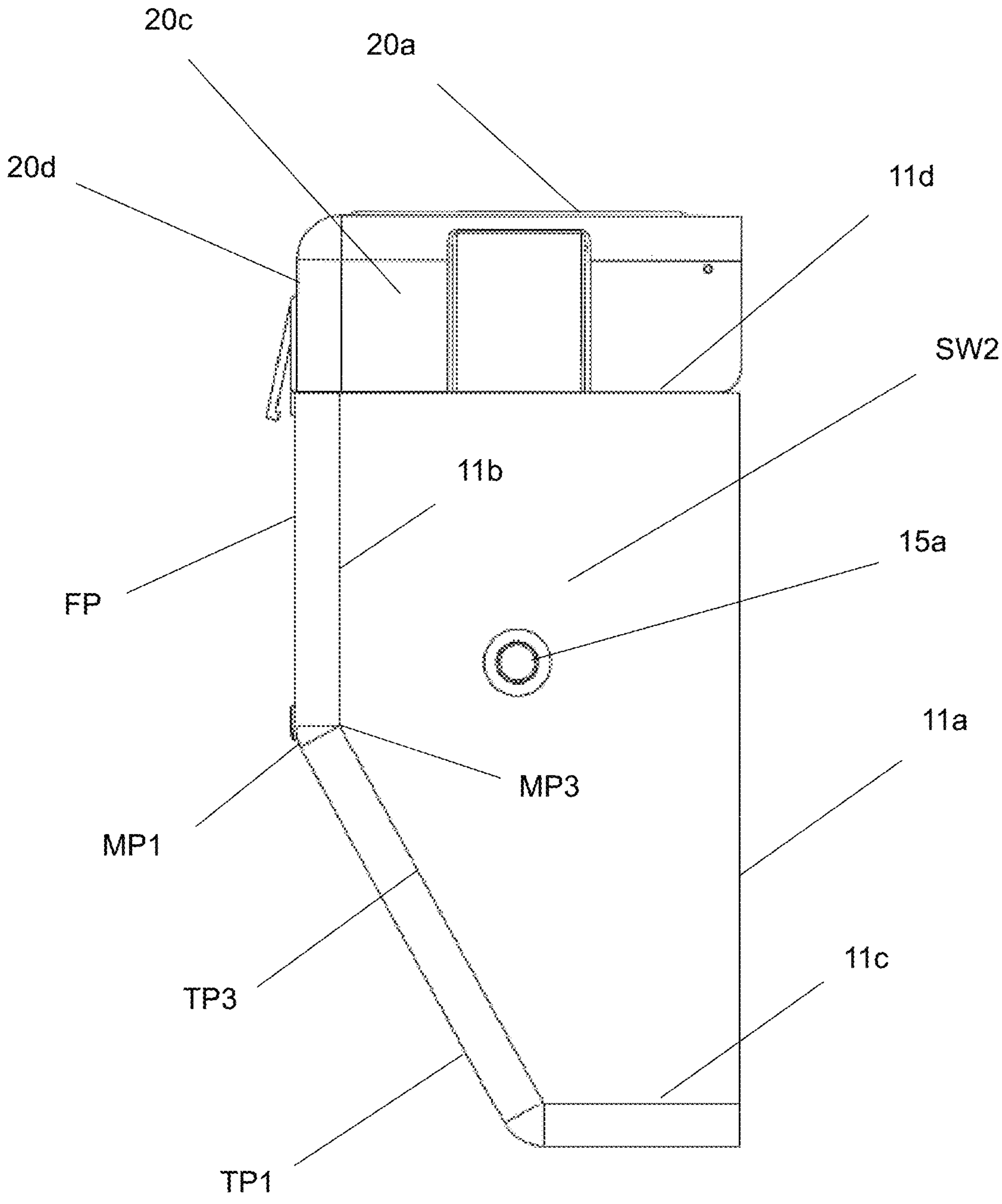
FIG. 4 shows a right-side view of the multi-use storage unit or module, in accordance with the principles of the present disclosure.
Figure 5:
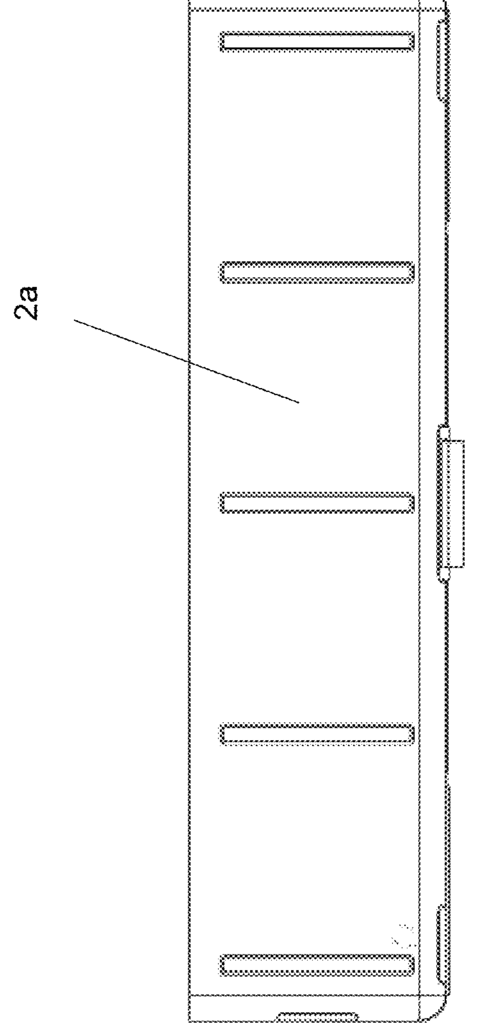
FIG. 5 shows a top view of the multi-use storage unit or module, in accordance with the principles of the present disclosure.
Figure 6:
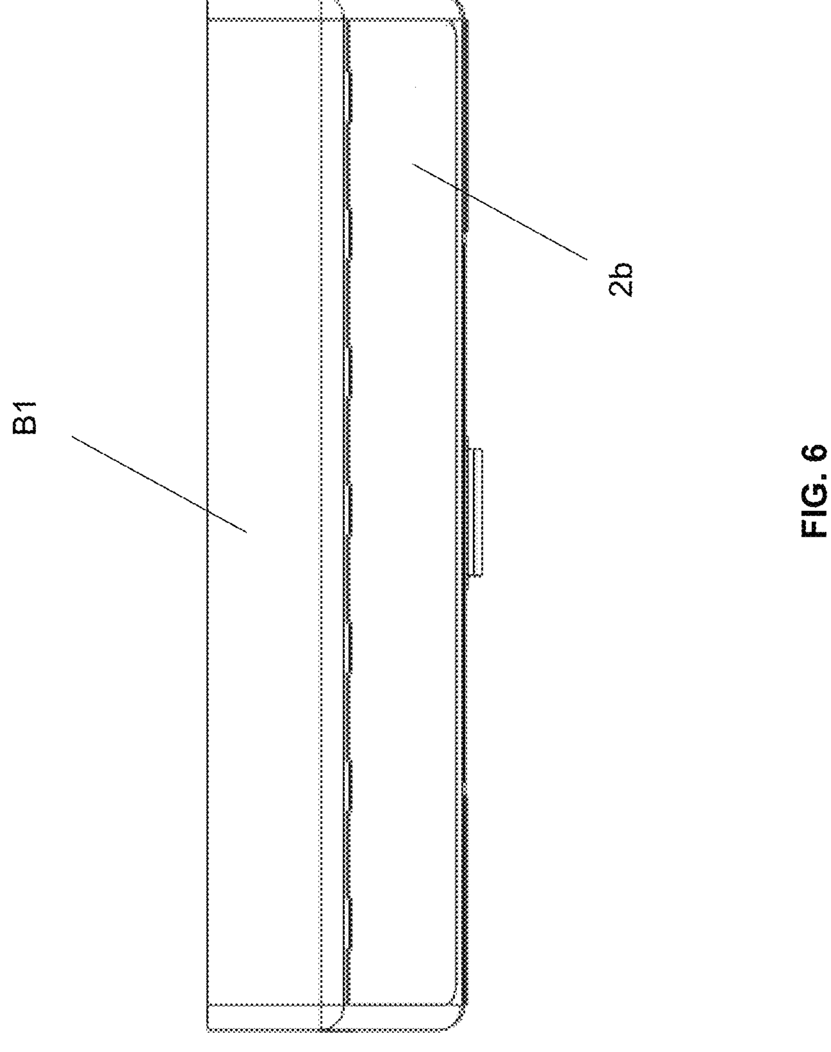
FIG. 6 shows a bottom view of the multi-use storage unit or module, in accordance with the principles of the present disclosure.
Figure 7:
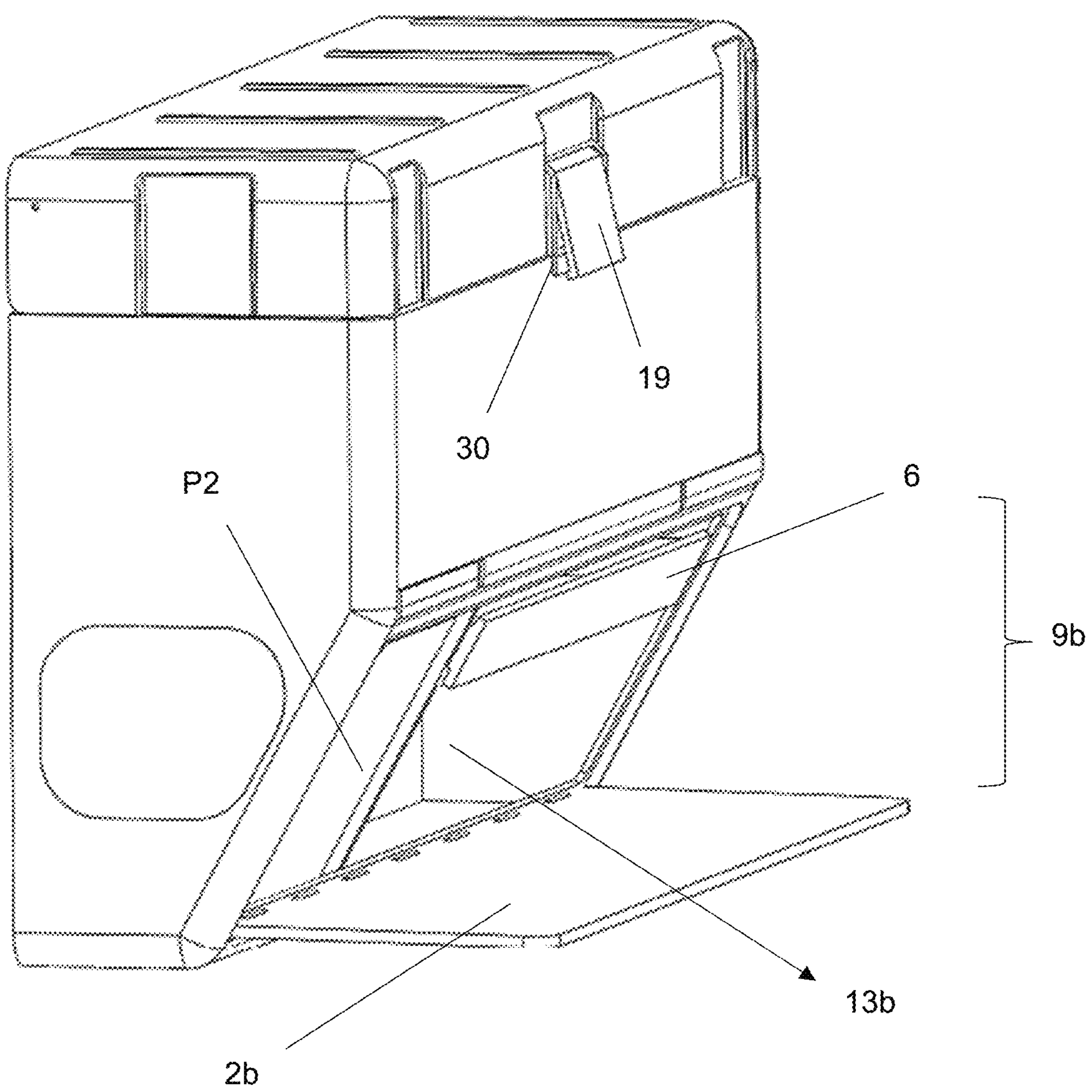
FIG. 7 shows the bottom lid component of the multi-use storage unit or module, in accordance with the principles of the present disclosure.
Figure 8:
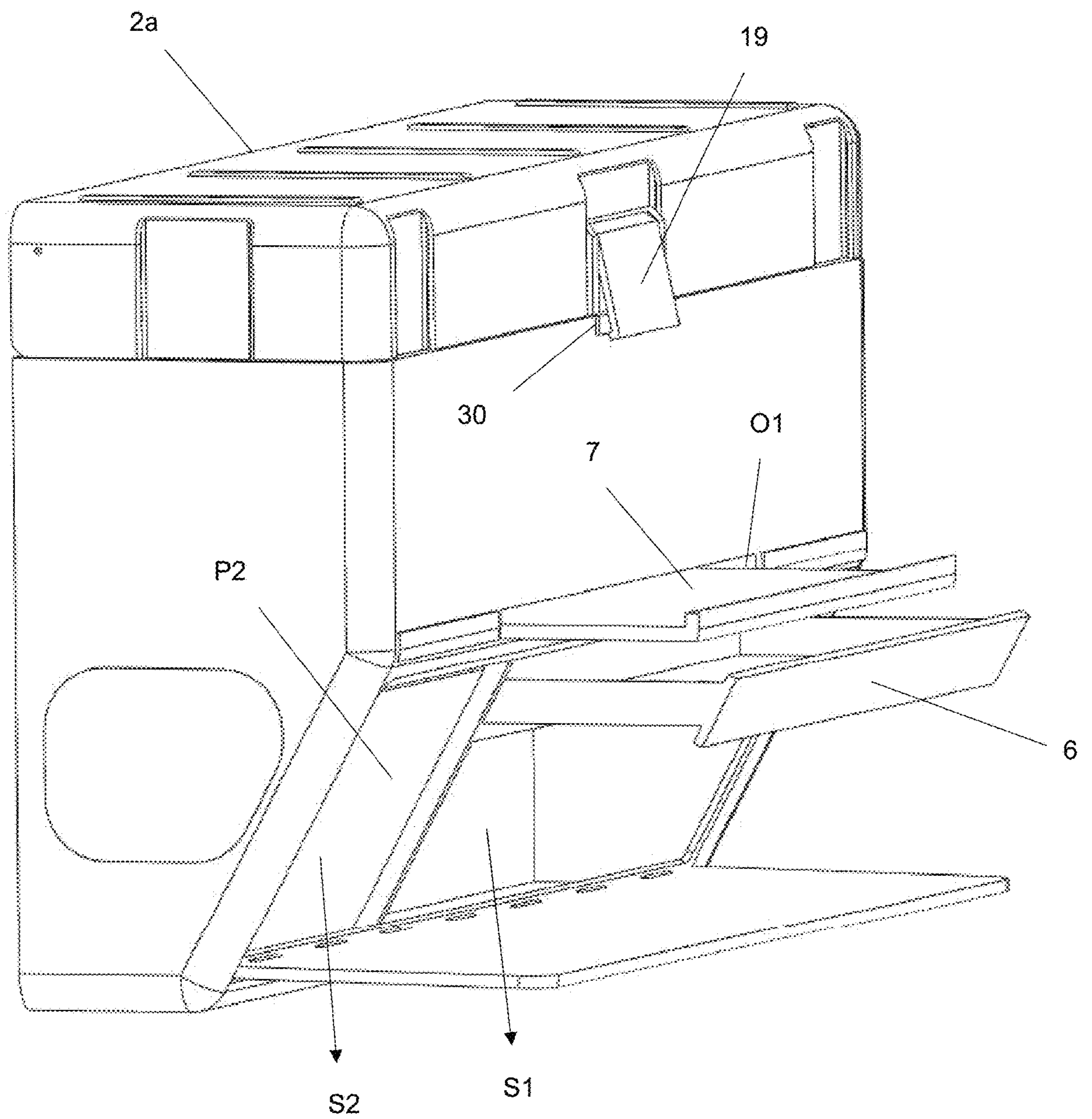
FIG. 8 shows the tray and storage drawer components of the multi-use storage unit or module, in accordance with the principles of the present disclosure.
Figure 9:
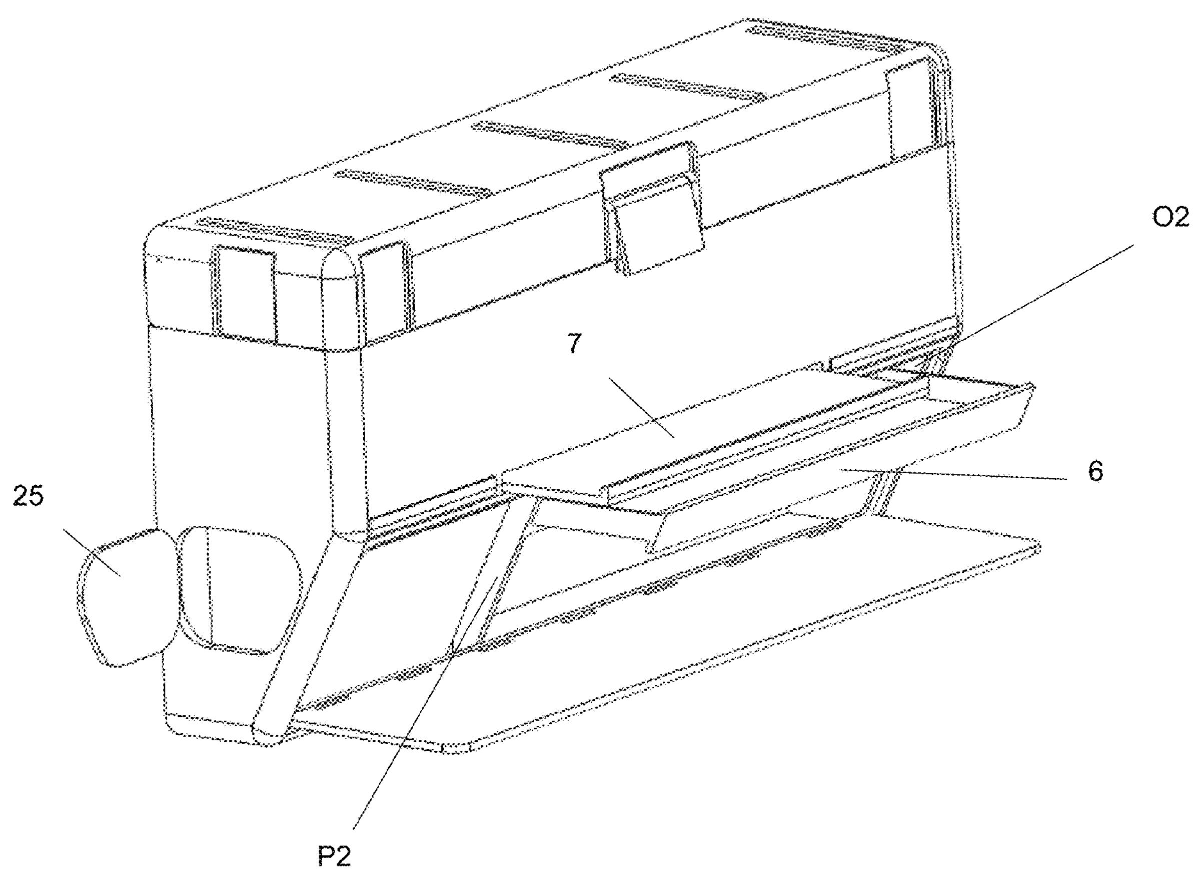
FIG. 9 shows the sidewall access door component of the multi-use storage unit or module, in accordance with the principles of the present disclosure.
Figure 10:
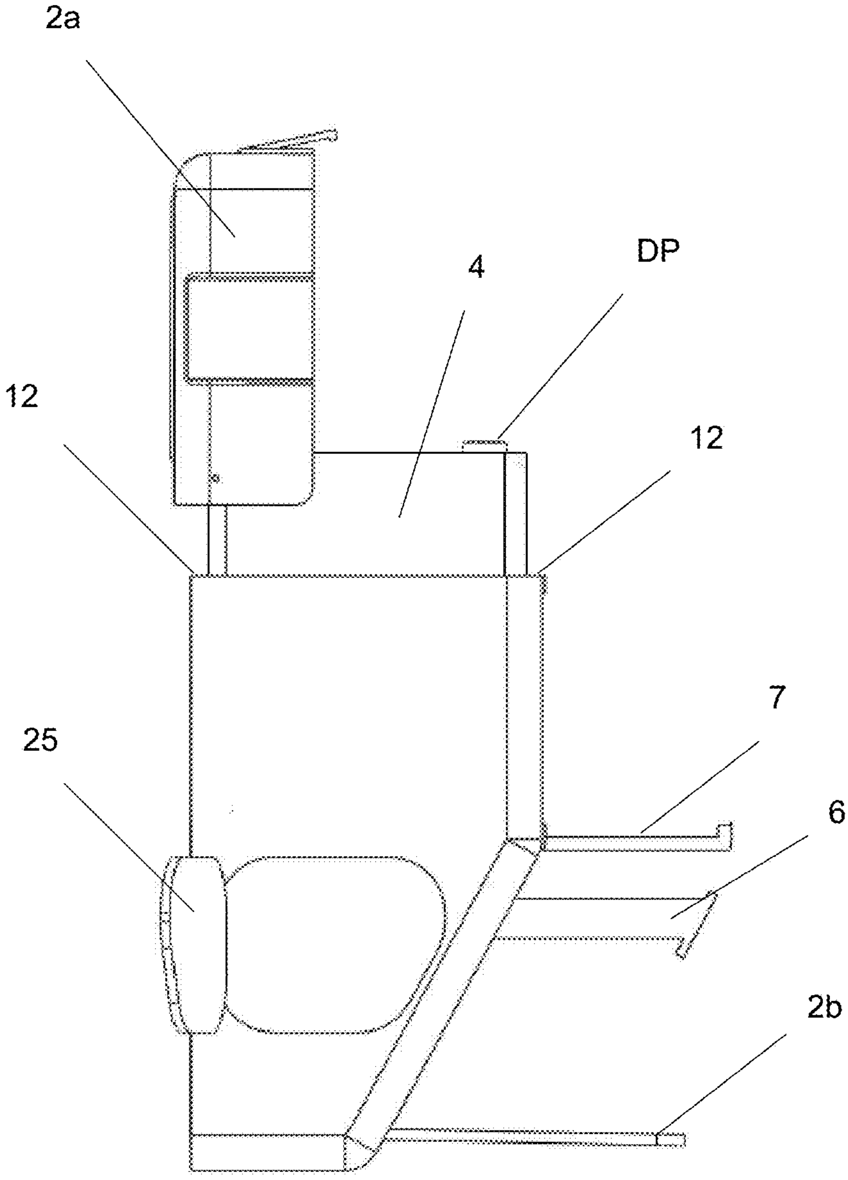
FIG. 10 shows a left-side view of the multi-use storage unit or module, in accordance with the principles of the present disclosure.
Figure 11:
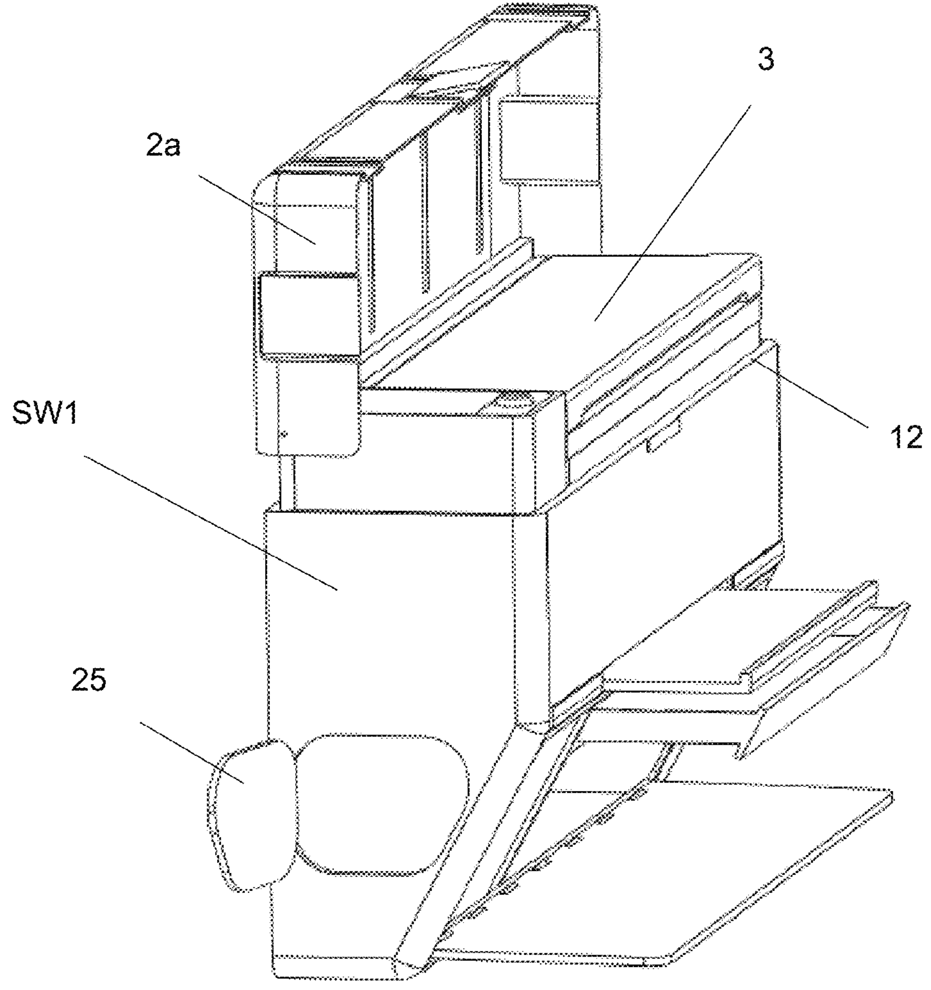
FIG. 11 shows a perspective view with an opened top lid of the multi-use storage unit or module, in accordance with the principles of the present disclosure.
Figure 15:
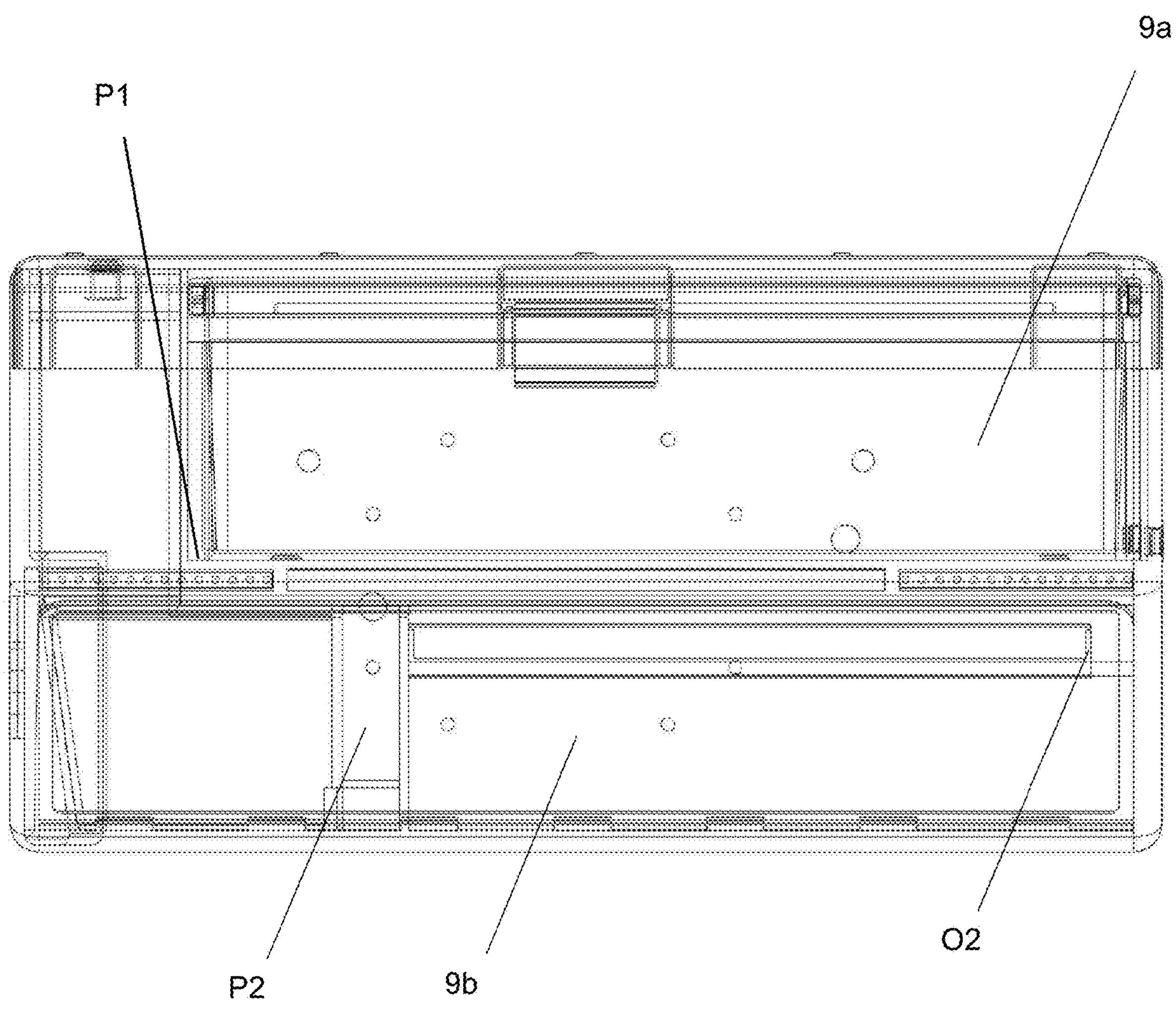
FIG. 15 shows an internal view of the multi-use storage unit or module, in accordance with the principles of the present disclosure.
Figure 17:
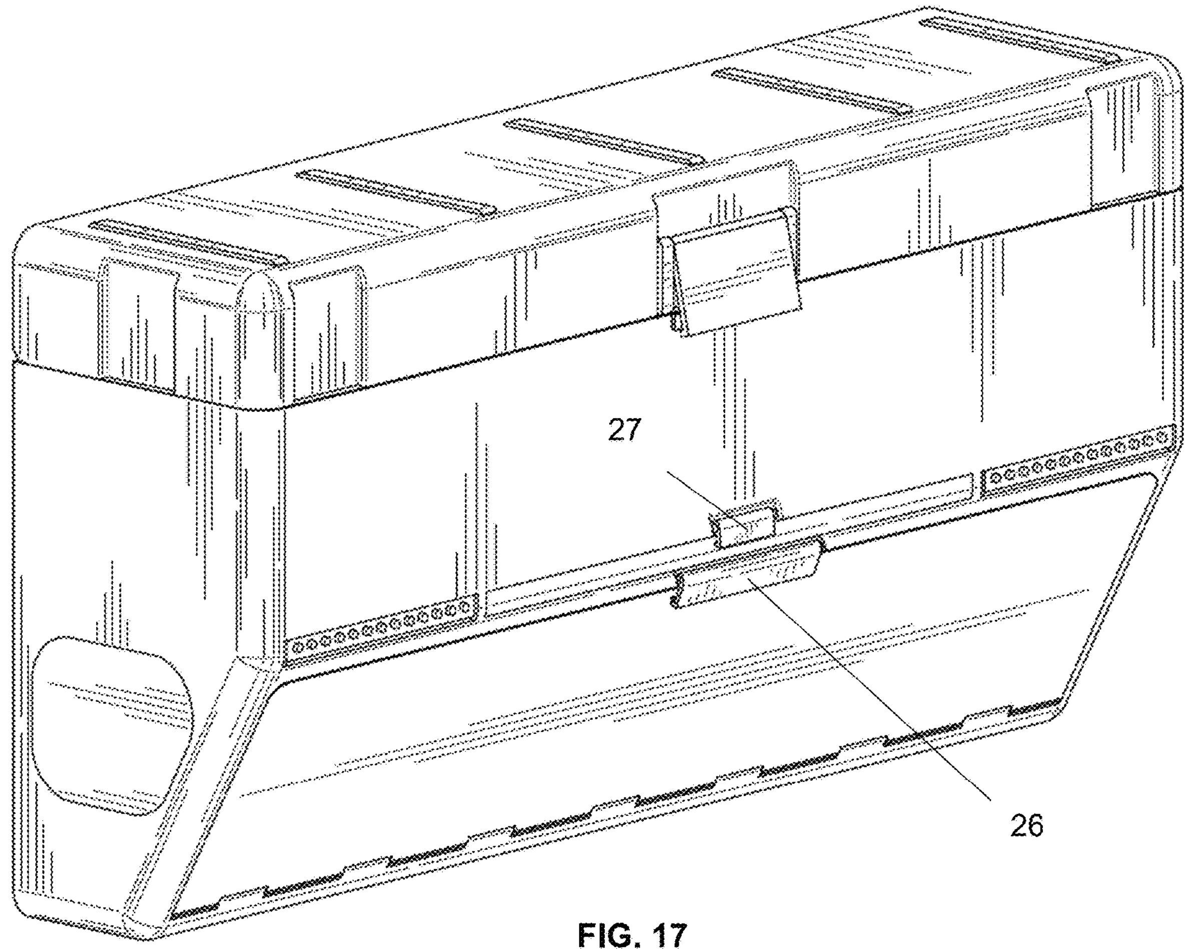
FIG. 17 shows a left-front perspective view of the multi-use storage unit or module, in accordance with the principles of the present disclosure.

Moreover, as shown in FIG. 15, the interior of the multi-use storage unit or module 1 comprises a horizontal internal partition P1 that is adapted to divide the interior volume or space of the multi-use storage unit or module 1 into an upper compartment 9*a* with an interior space 13*a* and a lower compartment 9*b* with an interior space 13*b*. The internal partition P1 is a horizontal structure that is preferably located within the interior of the multi-use storage unit or module 1 attached to a midpoint MP1 of the front panel FP and of the rear panel RP. As such, the horizontal internal partition P1 serves as a base for the upper compartment 9*a* and as a roof for the lower compartment 9*b*, as shown in FIG. 15. Access into the upper compartment 9*a* is achieved via the top lid 2*a*, as shown in FIGS. 10-12. Particularly, the top lid 2*a* is pivotally secured to an upper portion of the rear panel RP via a hinge or similar mechanism; and as such, the top lid 2*a* is adapted to provide access into the upper compartment 9*a*, or to close off access thereto. As shown in FIGS. 10-11, the top lid 2*a* may also be adapted to cover or fit over at least a portion of the ice chest or cooler 3 and/or the water deposit tank 4. Moreover, the top lid 2*a*, preferably comprises a top face 20*a*, a first lateral face 20*b*, a second lateral face 20*c*, and a front face 20*d*, the first and second lateral faces 20*a*, 20*b* being connected to opposing ends of the top face 20*a* and opposing ends of the front face 20*d*, as shown in FIGS. 3 and 4. It should be noted that the top lid 2*a* includes at least one latch 19 or similar closure mechanism (e.g., handle, magnetic closure, coupling mechanism, etc.) in the front face 20*d* adapted to secure the top lid 2*a* to a protrusion 30 near the perimeter of the front panel FP, as shown in FIGS. 7 and 8. Alternatively, the top lid 2*a* may include one or more latches 19 or similar mechanisms in one or both of the first or second lateral faces 20*a*, 20*b* adapted to secure the top lid 2*a* to a protrusion near the perimeter of the corresponding first sidewall SW1 or the second sidewall SW2. It should be noted that the at least one latch 19 may include a locking mechanism to prevent access to the interior of the upper compartment 9*a*. Access into the lower compartment 9*b*, on the other hand, is achieved via a bottom lid 2*b*, as shown in FIGS. 7 and 8. Particularly, the bottom lid 2*b* is preferably pivotally secured to a lower portion of the front panel FP via a hinge or similar mechanism; and as such, the bottom lid 2*b* is adapted to provide access into the lower compartment 9*b*, or to close off access thereto. Moreover, the bottom lid 2*b* may include a latch or locking mechanism 26 to prevent access to the interior of the lower compartment 9*b*, as shown in FIG. 17.

It should be noted that the front panel FP includes a diagonal or tapered portion TP1 commencing at the midpoint MP1 of the front panel FP and ending at the base B1, which reduces the surface area of the lower compartment 9*b* in comparison to the surface area of the upper compartment 9*a*, as shown in FIGS. 3 and 4. Moreover, the first sidewall SW1 includes a first lateral end 10*a*, a second lateral end 10*b*, a bottom end 10*c*, and a top end 10*d*, wherein the second lateral end 10*b* includes, at its midpoint MP2, a diagonal or tapered portion TP2 that reduces the surface area of the bottom portion of the first sidewall SW1 in comparison with the surface area of the upper portion of the first sidewall SW1, as shown in FIG. 3. Likewise, the second sidewall SW2 includes a first lateral end 11*a*, a second lateral end 11*b*, a bottom end 11*c*, and a top end 11*d*, wherein the second lateral end 11*b* includes, at its midpoint MP3, a diagonal or tapered portion TP3 that reduces the surface area of the bottom portion of the second sidewall SW2 in comparison with the surface area of the upper portion of the second sidewall SW2, as shown in FIG. 4. As such, the combination of the tapered portion TP1 of the front panel FP, the tapered portion TP2 of the first sidewall SW1, and tapered portion TP3 of the first sidewall SW2, allow the base B1 of the multi-use storage unit or module 1 to have the appearance of being flush or continuous with the rear bumper of the vehicle.

Figure 16:
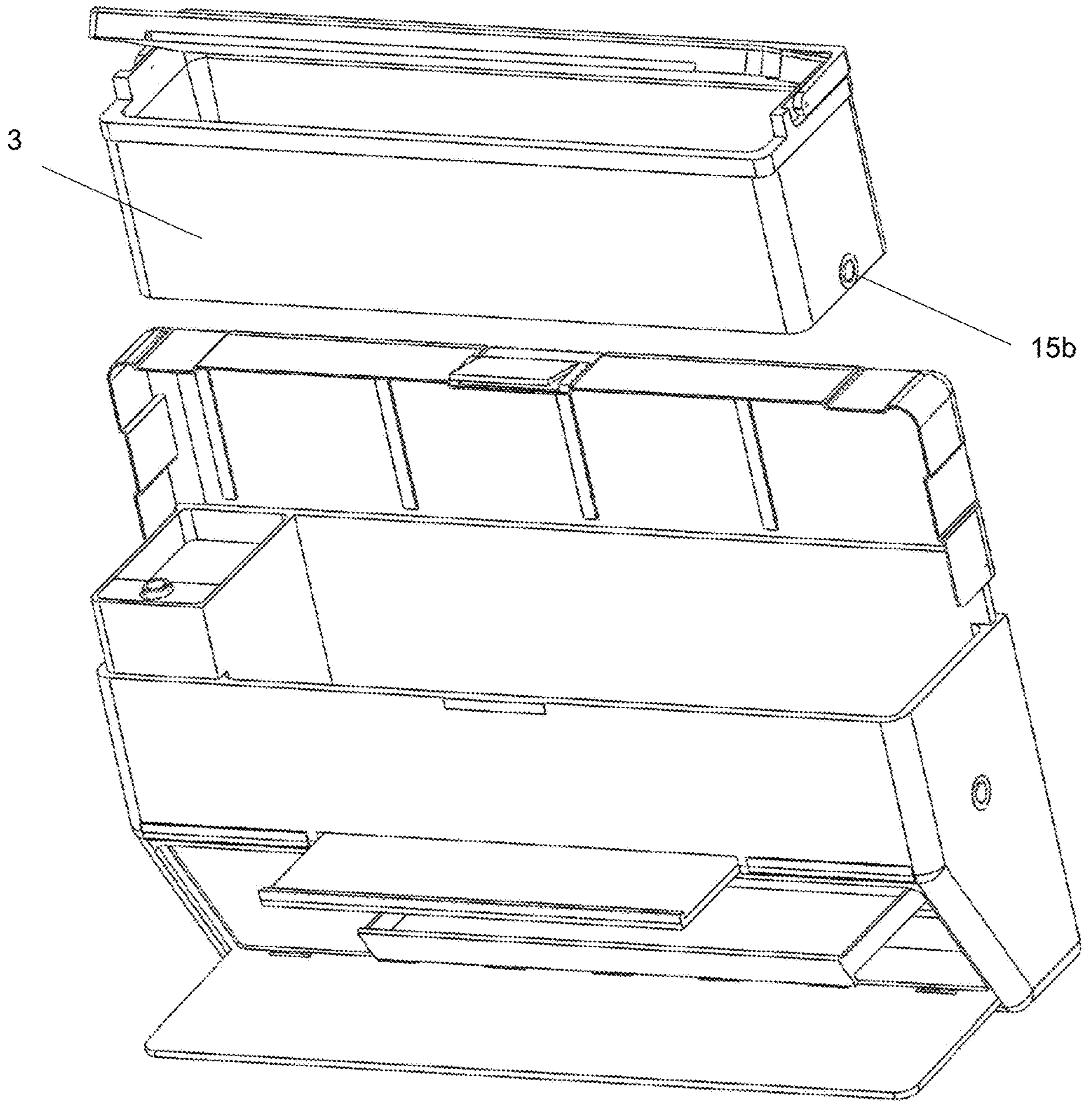
FIG. 16 shows the internal components of the multi-use storage unit or module, in accordance with the principles of the present disclosure.

As shown in FIGS. 1, 3, and 9-11, the first sidewall SW1 or the second sidewall SW2 may include an access door 25 adapted to provide access to the vehicle's rear door handle. The access door 25 may include a locking mechanism to prevent access thereto. Additionally, the edges formed by the connection between the first sidewall SW1 and the second sidewall SW2 with the rear panel RP and the front panel FP preferably comprise a rounded-edge configuration, but may also have any other configuration, such as squared or sharp edges. The first sidewall SW1 or the second sidewall SW2 may also include a drain hole 15*a* near the midpoint MP3 of the second sidewall SW2 adapted to drain any liquid inside the upper compartment 9*a*, as shown in FIG. 4. The ice chest or cooler 3 may also include a drain hole 15*b*, preferably in one of its sidewalls, adapted to drain any liquid stored therein, as shown in FIG. 16. The drain hole 15*a* of the second sidewall SW2 may be connected, via a hose or tube, to the drain hole 15*b* of the ice chest or cooler 3 to facilitate draining of the ice chest or cooler 3 without removing it from the upper compartment 9*a*.

Furthermore, the interior space 13*a* of the upper compartment 9*a* is adapted to fit at least a portion of both the ice chest or cooler 3 and the water deposit tank 4, as shown in FIGS. 11 and 12. As such, the upper compartment 9*a*, in combination with the top lid 2*a*, cover and fit the entirety of the ice chest or cooler 3 and the water deposit tank 4. The ice chest or cooler 3 is any container adapted to hold ice and/or food or drinking items that need to remain cool to be preserved or consumed. The ice chest or cooler 3 should preferably have a rectangular shape or configuration to be able to fit with a flush appearance within the upper compartment 9*a*. The ice chest or cooler 3 may also contain a handle 14 to assist in carrying the ice chest or cooler 3 around or in removing it from the upper compartment 9*a*. The water deposit tank 4 is a container adapted to safely hold drinking water or any other liquid meant to be consumed by humans. As shown in FIG. 10, the water deposit tank 4 should preferably include a dispenser DP for dispensing the liquid inside the deposit tank; and should preferably have a rectangular shape or configuration to be able to fit with a flush appearance within the upper compartment 9*a*.

Figure 14:
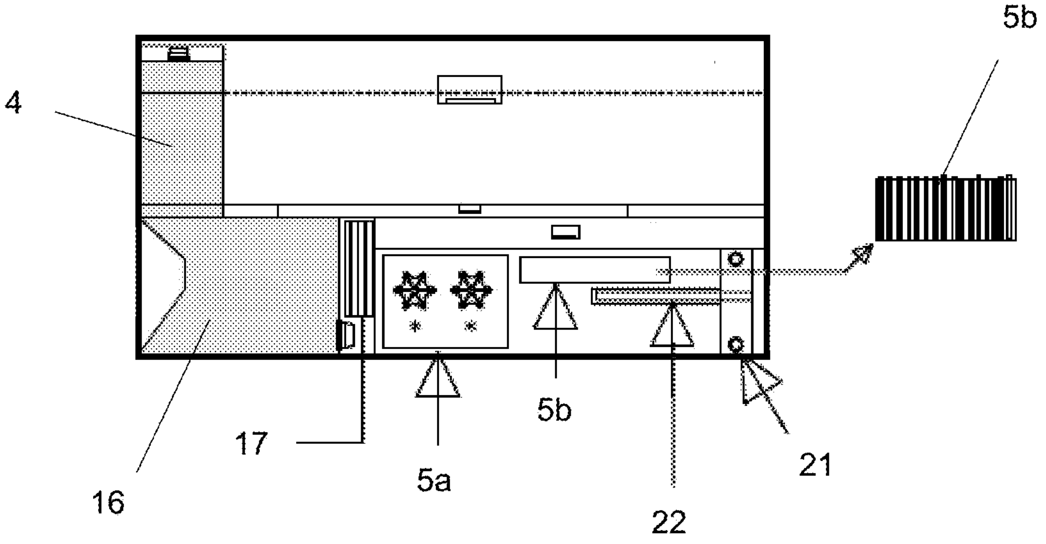
FIG. 14 shows the stove and grill unit components of the multi-use storage unit or module, in accordance with the principles of the present disclosure.

The interior space 13*b* of the lower compartment 9*b*, on the other hand, may include a vertical wall or partition P2 adapted to sub-divide the lower compartment 9*b* into two separate sub-compartments, namely: a first sub-compartment S1 and a second sub-compartment S2, as shown in FIG. 8. The first sub-compartment S1 of the lower compartment 9*b* is adapted to fit or house the stove 5*a*, the grill unit 5*b* and the storage drawer 6. The storage drawer 6 is located in a slot O2 on the first sub-compartment S1 (preferably located on an upper area of said first sub-compartment) that is adapted to receive the storage drawer 6. The first sub-compartment S1 of the lower compartment 9*b* should preferably include a support base 21 with an adjustable arm extension 22, wherein the adjustable arm extension 22 includes a first end rotatably attached to the support base 21 and a second end attached to the grill unit 5*b*, as shown in FIG. 14. The purpose of the support base 21 is to provide a structure upon which the arm extension 22 can be rotatably attached to. Attachment of the grill unit 5*b* to the arm extension 22 allows for the grill unit 5*b* to be pulled towards the user and away from the lower compartment 9*b*. This provides the user of the grill unit 5*b* with more space to operate the grill. To store the grill unit 5*b*, the user would simply return it to its original position by pushing the arm extension 22 towards the first sub-compartment S1 of the lower compartment 9*b*.

The stove 5*a*, on the other hand, is adapted to fit or lie resting on the base B1 within the sub-compartment S1 of the lower compartment 9*b*, directly beneath the slot O2 for the storage drawer 6, as shown in FIG. 14. It should be noted that the stove 5*a* and grill unit 5*b* unit are provided with circuitry and/or connectivity adapted to receive power from the vehicle's power supply. The stove 5*a* and grill unit 5*b* unit may also operate with gas tanks that can be stored within the first sub-compartment S1 of the lower compartment 9*b*. The second sub-compartment S2, on the other hand, serves as additional storage space within the lower compartment 9*b*, separated from the stove 5*a* and the grill unit 5*b*, which protects the items stored therein from contacting the food items being prepared in the stove/grill unit 5. As also shown in FIG. 14, the second sub-compartment S2, may alternatively include a water tank 16 and a hose 17, wherein the water tank 16 includes a dispenser adapted to connect the hose 17 thereto, thereby allowing the user of the vehicle to spray or convey the liquid inside the water tank in a desired direction or use it to clean the multi-use storage unit or module 1.

The tray 7, in turn, is located near the midpoint MP1 of the front panel, wherein the front panel FP includes a hole or opening O1 between the upper compartment 9*a* and the lower compartment 9*b* that is adapted to receive the tray 7, as shown in FIG. 8. The hole or opening O1 on the front panel FP and the slot O2 on the first sub-compartment S1 may include means for sliding the tray 7 or storage drawer 6 in or out of the corresponding opening O1 or slot O2, such as ball bearings or rollers adapted to roll in a track that allows the tray or drawer to move in and out of the corresponding housing with less friction. The tray 7 or storage drawer 6 may also be installed without any mechanism for sliding and instead rely on friction to be inserted or removed from the corresponding opening O1 or slot O2. Moreover, the tray 7 may include a latch or locking mechanism 27 to lock to the tray within the hole or opening O1, as shown in FIG. 17

Figure 1:
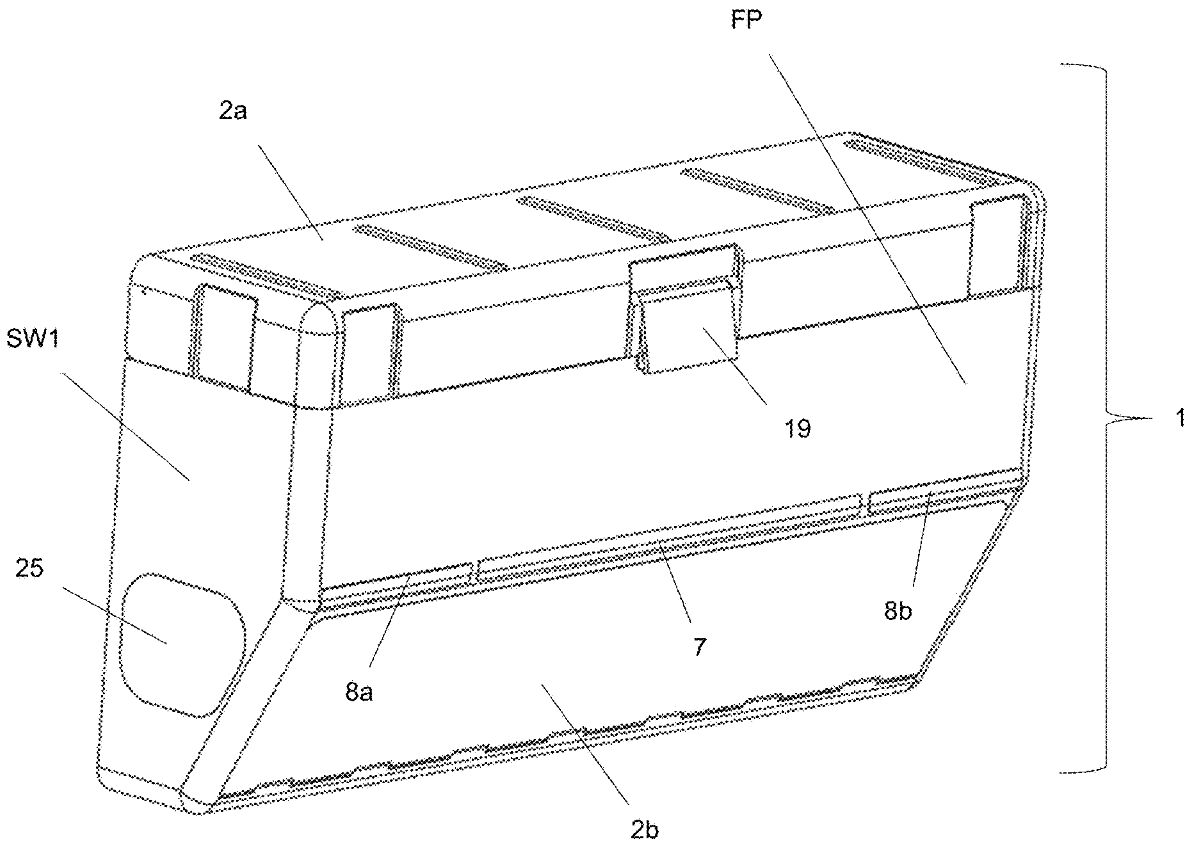
FIG. 1 shows a perspective front view of a multi-use storage unit or module that is attachable to the rear door, in accordance with the principles of the present disclosure.
Figure 2:
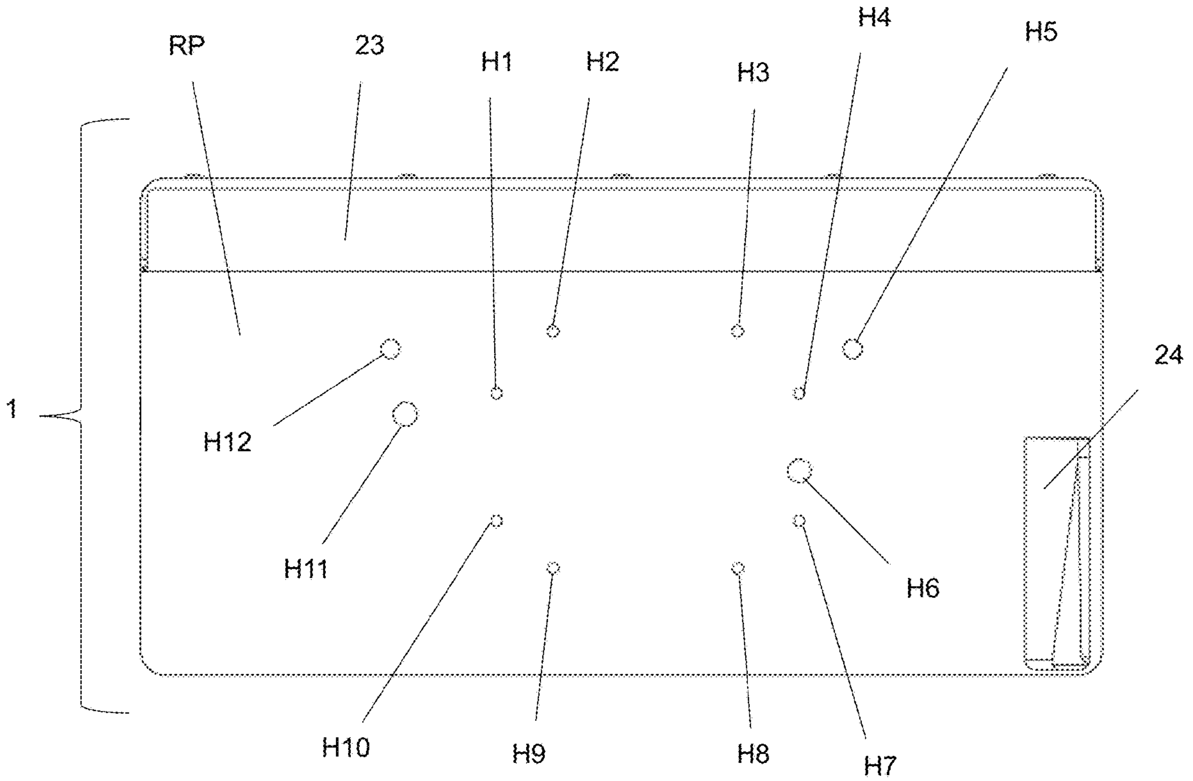
FIG. 2 shows a rear view of the multi-use storage unit or module, in accordance with the principles of the present disclosure.

Lastly, it should be noted that the lighting assemblies 8*a*, 8*b* are located at the midpoint MP1 of the front panel FP, preferably flanking the opening O1 of the tray 7, as shown in FIG. 1. As previously noted, the lighting assemblies 8*a*, 8*b* assist in alerting other drivers behind the vehicle of the vehicle's presence. Moreover, the lighting assemblies 8*a*, 8*b* are provided with circuitry and/or connectivity adapted to receive power from the vehicle's power supply.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A multi-use storage module that is attachable to a vehicle's rear door, comprising:

a first sidewall, a second sidewall, a rear panel, a front panel, and a base, wherein each of the first sidewall, the second sidewall, the rear panel, and the front panel is perpendicularly connected to the base;

wherein the first sidewall and the second sidewall connect the front panel and the rear panel to each other, thereby forming a perimeter that defines an interior volume for the storage module;

a horizontal internal partition within the storage module that is adapted to divide the interior volume of the storage module into an upper compartment with an interior space and a lower compartment with an interior space;

a top lid pivotally secured to an upper portion of the rear panel, wherein the top lid is adapted to provide access into the upper compartment or to close off access thereto;

a bottom lid pivotally secured to the front panel, wherein the bottom lid is adapted to provide access into the lower compartment or to close off access thereto;

wherein the interior space of the lower compartment comprises a vertical partition adapted to subdivide the lower compartment into a first sub-compartment and a second sub-compartment; and wherein the first sidewall or the second sidewall includes an access door adapted to provide access to a rear door handle of the vehicle.

2. The multi-use storage module of claim 1, further comprising at least one article selected from the group consisting of an ice chest, a water deposit tank, a stove, a grill unit, a storage drawer, a tray, and one or more lighting assemblies, or combinations thereof.

3. The multi-use storage module of claim 2, wherein the interior space of the upper compartment is adapted to fit at least a portion of the ice chest and the water deposit tank.

4. The multi-use storage module of claim 2, wherein the first sub-compartment of the lower compartment is adapted to fit or house the stove, the grill unit, and the storage drawer.

5. The multi-use storage module of claim 2, wherein the first sub-compartment of the lower compartment includes a support base with an adjustable arm extension, and wherein the adjustable arm extension includes a first end rotatably attached to the support base and a second end attached to the grill unit.

6. The multi-use storage module of claim 2, wherein the stove is adapted to fit on the base within the sub-compartment of the lower compartment.

7. The multi-use storage module of claim 2, wherein the tray is located in the lower compartment of the storage module.

8. The multi-use storage module of claim 2, wherein the lighting assemblies are located at a midpoint of the front panel.

9. The multi-use storage module of claim 1, wherein the second sub-compartment includes a water tank and a hose.

10. The multi-use storage module of claim 1, wherein the front panel includes an opening between the upper compartment and the lower compartment that is adapted to receive a tray.

11. The multi-use storage module of claim 1, further comprising a slot on the first sub-compartment that is adapted to receive a storage drawer.

12. The multi-use storage module of claim 1, wherein the front panel includes a diagonal or tapered portion commencing at a midpoint of the front panel and ending at the base.

13. The multi-use storage module of claim 12, wherein the first sidewall or the second sidewall includes a first lateral end, a second lateral end, a bottom end, and a top end, wherein the second lateral end of the corresponding first sidewall or second sidewall includes, at its midpoint, a diagonal or tapered portion that reduces the surface area of the bottom portion of the corresponding first sidewall or second sidewall.

14. The multi-use storage module of claim 1, wherein the rear panel and the front panel have a length that is greater than the length of each of the first sidewall and the second sidewall.

15. The multi-use storage module of claim 1, wherein the first sidewall or the second sidewall includes a drain hole adjacent to a midpoint of the corresponding first sidewall or second sidewall adapted to drain a liquid inside the upper compartment.

16. The multi-use storage module of claim 1, wherein the rear panel includes one or more holes adapted to receive bolts or fasteners to secure the multi-use storage module to a rear door of a vehicle.

17. The multi-use storage module of claim 1, wherein the top lid includes at least one latch or locking mechanism.

18. The multi-use storage module of claim 1, wherein the rear panel includes an extended portion adapted to provide an anchoring area for the hinge of the top lid.

19. The multi-use storage module of claim 1, wherein the rear panel is adapted to receive one or more hooks to secure the multi-use storage module to a rear door of a vehicle.

* * * * *